Dec. 9, 1958
H. HURVITZ
2,863,711
RECORDING
Filed April 18, 1955
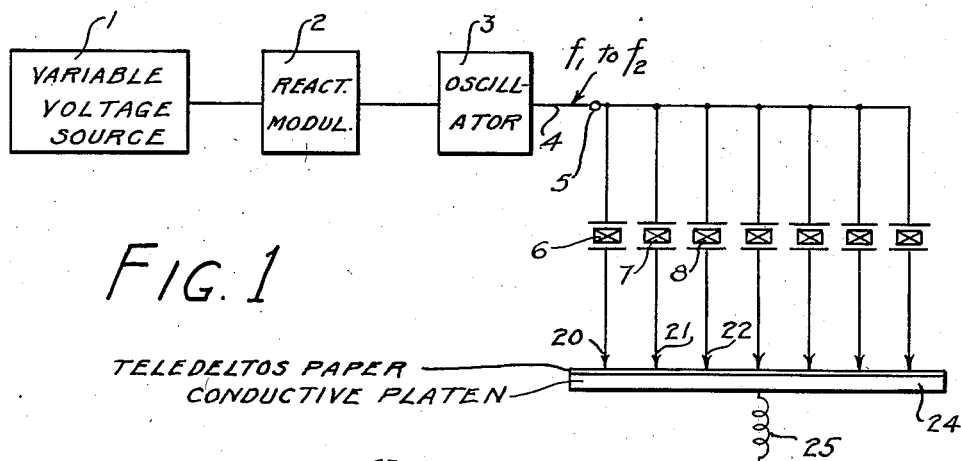
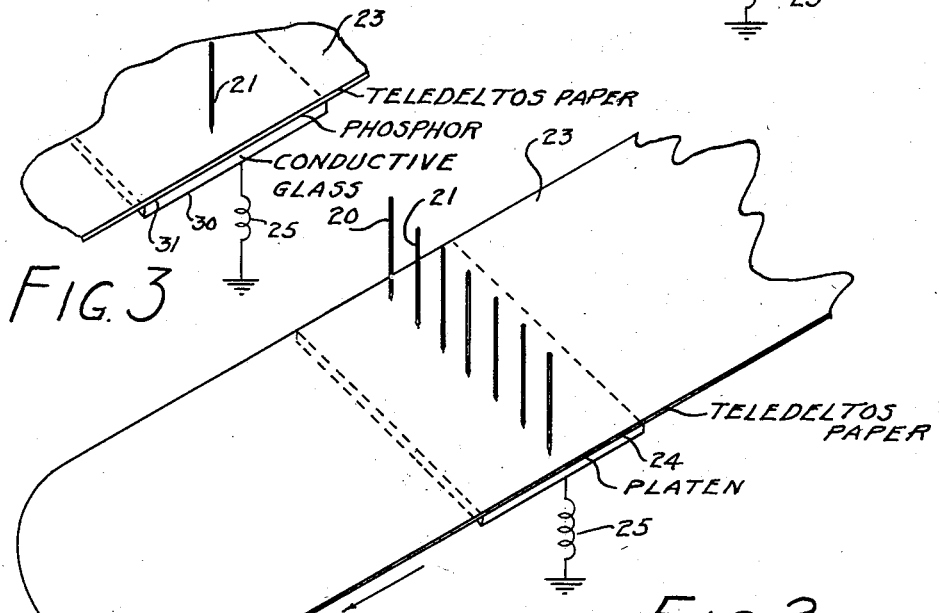
INVENTOR
Hyman Hurvitz United States Patent Office 2,863,711
Patented Dec. 9, 1958

2,863,711

RECORDING

Hyman Hurvitz, Washington, D. C.

Application April 18, 1955, Serial No. 501,891

15 Claims. (Cl. 346—74)

The present invention relates generally to recording on voltage sensitive paper, and more particularly to systems of recording on voltage sensitive paper by means of a plurality of stationary styli.

The desirability of recording on voltage sensitive paper, such as the paper sold widely under the trade name Teledeltos, or other chemically impregnated or treated recording media which discolor upon flow of electric current therethrough, is well known in the art. Recorders have been constructed, and are widely used, which record on voltage sensitive paper by means of a plurality of stationary styli, distributed transversely across the paper. In such recording processes the paper is fed in a direction transversely of the line of styli, and the styli are gated on individually, in accordance with the value of a quantity to be recorded, by means of commutator tubes, or by means of mechanical commutators. Since it is frequently desirable to utilize a very considerable number of styli, of the order of one or two hundred, the number of vacuum tubes or thyratron tubes required for accomplishing the commutation of the styli is considerable, and a large and bulky recorder results. On the other hand, utilization of mechanical commutators is not satisfactory for many purposes because the desired speed of recording is above the speed at which a mechanical commutator may be operated.

It is an objective and primary feature of the present invention to commutate a plurality of styli, or to select one or more of such styli from a large number, without requiring the use of commutating tubes or the use of a mechanical commutator.

Briefly describing the present invention, I utilize as a recording medium a strip of voltage sensitive paper, such as Teledeltos paper or chemically impregnated paper, which discolors on passage of electric current therethrough. The paper is actuated longitudinally by means of a clock, a motor, or the like, and a plurality of styli are arranged in a row extending transversely of the strip of paper, the ends of the styli being in contact with the paper. Under the paper and immediately below the line of styli is a conductive platen, which is connected to ground by means of an inductance which operates as a tuning coil. In series with each of the styli is a piezo-electric crystal, the separate crystals being resonant to adjacent frequencies so that in proceeding along the array of crystals the resonant frequencies of the crystals vary progressively. Frequency spacing between adjacent crystals is selected in accordance with the Q of the crystals and the mean frequency of operation, so that some small overlap of the selectivity curves of adjacent crystals occurs, perhaps at the 3 db down points of the curves. The crystals are all connected in parallel with a source of variable frequency voltage. This voltage may be derived from an oscillator, the frequency of which is controlled by a reactance modulator in response to a variable voltage, the magnitude of which it is desired to record. Accordingly, the frequency of the oscillator at each instant of time is representative of the amplitude of the voltage, and as this frequency varies the separate piezo-electric crystals become individually conductive by reason of their identity of resonant frequency with the frequency of the applied signal.

When a crystal is tuned precisely to the frequency of the applied signals, the crystal represents an open circuit, but otherwise represents a closed circuit. Accordingly, the crystals operate as electrical switches, being essentially either closed or open, in accordance with the frequency of the signal applied thereto.

The area of the voltage sensitive paper which subsists between a probe and the platen underlying the probes is essentially one plate of a condenser, the paper constituting the dielectric, and the platen constituting the other plate. The array of probes, accordingly, constitutes an array of condensers. The capacity of these condensers is resonated with the inductance hereinbefore referred to, and the resonant circuit so formed has a sufficiently low Q that the resonant circuit is at least substantially resonant over the entire band of frequencies encompassed by the array of piezo-electric crystals. Accordingly, when any crystal conducts, a relatively high voltage appears across the probe associated with that crystal and the area of the plate underlying the probe, and this voltage is adequate to discolor the paper. Should the paper be punctured, by application of over-voltage, in effect the condenser of which it forms the dielectric is short-circuited. However, since the paper is continually fed, a new area of paper is continually being supplied, so that for all practical purposes the condenser is continually being reformed.

It is well known that piezo-electric crystals are resonant to a plurality of harmonic frequencies. In accordance with the present invention the resonant circuit formed by the probes, the plate, and the tuning coil prevent response at any frequency outside the range of tuning of the resonant circuit, so that the crystals are capable of producing a record only in response to one selected harmonic.

The velocity at which recording may be accomplished is determined by the speed with which a piezo-electric crystal responds to an applied voltage at its resonant frequency, and this in turn is a function of the Q of the crystal. Obviously crystals may be damped in one of a number of known ways, to lower this Q, if more rapid recording is desired than is feasible when utilizing unloaded crystals. It has been determined experimentally that commercially available low cost crystals are entirely capable of passing far more current than is actually required to accomplish recording utilizing commercially available Teledeltos paper.

It is, accordingly, a broad object of the present invention to provide a novel recorder capable of recording on voltage sensitive record receiving media.

It is a further object of the present invention to provide a multiple stylus recorder in which the styli are commutated by means of resonant circuits, and more particularly by means of resonant piezo-electric crystals.

The above and still further objects, features, and advantages of the present invention will become apparent upon consideration of the following detailed disclosure of a specific embodiment of the invention, especially when taken in conjunction with the accompanying drawings, wherein:

Figure 1 is a diagram partly schematic and partly in functional block, of a recorder arranged in accordance with the invention;

Figure 2 is a view in perspective illustrating the structural arrangement of the recorder per se, exclusive of its controlling circuits; and Figure 3 is a cut-away view in perspective of a recorder employing an electroluminescent platen.

Referring now more particularly to Figure 1 of the accompanying drawings, the reference numeral 1 denotes a variable voltage source. This source may be a bridge, utilized for measuring a physical quantity, such as strain, or the output of any other measuring device which provides as its output an amplitude varying voltage representative of a physical quantity. The voltage output of the variable voltage source 1 is applied to control a reactive tube modulator 2 which in turn controls the frequency of an oscillator 3, varying the frequency of the oscillator 3 over a band of frequencies arbitrarily selected to extend from a value $f_1$ to a value $f_2$. This frequency may be transmitted to a terminal 5 over a lead 4, or via a cable or a radio transmission path, as desired. It is assumed that the variable frequency voltage as it arrives at the terminal 5 is of sufficient amplitude to actuate a recorder. If it is not, suitable stages of amplification may be interposed, and if the signal is applied in the form of a radio carrier, suitable devices for heterodyning the carrier to a suitable value, and for amplifying the carrier, may be provided. In any event at the terminal 5 is provided a variable frequency voltage which may be assumed to be of constant amplitude, but to possess any frequency within the range $f_1$ to $f_2$.

The signal provided to the terminal 5 is applied in parallel to a plurality of crystals 6, 7, 8, etc., as many as several hundred crystals being feasibly employed, by suitably selecting the frequencies of operation.

The frequencies of the crystals 6, 7, 8, etc. are selected to lie one adjacent to the other, and to encompass the entire band $f_1$ to $f_2$, with some overlap of selectivity curves, as hereinabove explained. Accordingly, any frequency which may be received at the terminal 5 will find one and only one of the piezo-electric crystals 6, 7, 8, etc. to be resonant thereto. That one crystal will appear to the incoming electric signal as an open circuit. All the remaining crystals will appear to the incoming signal as a closed circuit. Accordingly, the function of commutating has been accomplished without utilization of tubes or mechanical commutators, and entirely by means of relatively inexpensive piezo-electric crystals, which do not consume any power, which do not dissipate appreciable heat, and which are effectively 100 percent efficient.

Each of the piezo-electric crystals 6, 7, 8, etc. terminates in a stylus or probe, the latter being numbered 20, 21, 22, etc., the probe 20 being in series with the piezo-electric crystal 6, the probe 21 in series with the piezo-electric crystal 7, etc.

The probes 20, 21, 22, etc. have ends which rest lightly on a strip 23 of voltage sensitive paper, which may be specifically of the type sold commercially under the trade name Teledeltos. Underlying the paper strip 23, and in alignment with the probes 20, 21, 22, etc., is a metal platen 24 which is connected to ground via a tuning coil 25.

The styli 20, 21, 22 are opposed to the platen 24, and are separated therefrom by the paper strip 23. Accordingly, the probes are seen by the crystal circuits as a plurality of small condensers. These condensers each possess a capacity. This capacity is resonated at the approximate frequency of the various crystals by a tuning coil 25. The condenser in series with the coil 25 has a relatively broad resonance curve, i. e. a relatively low Q of the order of about 15 or 20. Accordingly, a single tuning coil may be utilized in conjunction with a large number of piezo-electric crystals, and the resonant circuit provided by the coil 25 and its associated probe capacity may be said to be resonant to the frequency of any of the crystals, at least approximately.

When any one of the crystals 6, 7, 8, etc. passes current to its associated probe, as 20, 21, 22, etc., a relatively high voltage appears across the condenser formed by the probe, the platen 24 and the area of strip lying therebetween, by reason of the fact that this condenser is part of a resonant circuit. Accordingly, a relatively high voltage appears across the condenser, a heavy current flows, and the Teledeltos paper discolors. As the frequency applied to the terminal 5 varies, the crystals 6, 7, 8, etc. become conducting in sequence, and accordingly the position at which discoloration of the voltage sensitive paper occurs correspondingly varies, and a line is traced on the paper as the paper moves longitudinally.

The strip 23 is collected on a take-up roll 26 by means of a synchronous electric motor, or by a clock motor 27.

It has been found that a number of frequencies may be simultaneously recorded by means of my novel recorder, since it is not necessary that only a single one of the crystals be conductive at any one instant of time. It is true that as the number of recordings simultaneously occurring increases the capacity in series with the inductance coil 25 similarly increases, but it has been found in practice that the resonant circuit including the coil 25 does not for that reason depart from resonance sufficiently to upset operation of the system. It is also true that use of a resonant tuning coil 25 may be entirely dispensed with, in which case a higher level of input signal is required.

Should it occur that the voltage applied to the voltage sensitive paper is sufficiently high to puncture the paper, no damage results since as the paper is fed a new area of unpunctured paper is continually being supplied to the styli and the resonant voltage rise across the paper is continually being regenerated. For best operation, however, puncturing the paper is of course not desirable, and it may be avoided by utilizing a sufficiently low input signal level, or by connecting protective resistances in series with the styli.

In accordance with still a further embodiment of the present invention, illustrated in Figure 3 of the accompanying drawings, the conductive platen 24 of Figures 1 and 2 of the drawings is replaced by a platen consisting of a plate of conductive glass, or other transparent material, 30, having a layer of electroluminescent phosphor dispersed in a dielectric medium, 31, disposed thereon. The Teledeltos sheet 23 rests on the phosphor layer. When current flows to the platen it passes through the phosphor, exciting the latter, and causing a luminous glow. Since this current also passes through the electrosensitive paper 23 a recording is also produced. It is, accordingly, possible to follow recorded values even in the dark, by observing the glow through the transparent plate 30, as the recording is produced.

While I have described and illustrated one specific embodiment of my invention it will be apparent upon consideration of the enclosed drawings to those skilled in the art that variations of the specific arrangement may be resorted to without departing from the true spirit and scope of the invention as defined in the appended claims.

What I claim is:

1. A recorder for recording on a voltage sensitive recording medium, said recorder including a plurality of stationary styli in contact with said medium, a separate piezo-electric filter consisting of a piezo-electric crystal and electrodes therefor in series with each of said styli, and means for applying a frequency varying signal in parallel to said piezo-electric filters, said piezo-electric filters each series resonant to a different frequency.

2. A recorder for recording on a voltage sensitive recording medium, said recorder including a plurality of stationary styli in contact with said medium, a separate piezo-electric crystal filter consisting of a piezo-electric crystal and electrodes therefor in series with each of said plurality of styli, said filters each tuned to a different frequency in a predetermined frequency band, and means for applying in parallel to said filters at least one signal in said frequency band.

3. The combination in accordance with claim 2, wherein a further electrode is in contact with said medium adjacent to each of said styli, and means for tuning the electrical condenser electrically provided by each stylus and its adjacent electrode to be substantially series resonant over said frequency band.

4. A recorder for recording quantized amplitude of a voltage on a voltage sensitive recording medium, comprising an oscillator, means responsive to said voltage for frequency modulating the output of said oscillator within a band of frequencies in accordance with amplitude of said voltage, a recorder for said band of frequencies comprising a plurality of stationary styli in contact with said medium, a separate piezo-electric filter in series with each of said styli, said filters having individual series resonant frequencies at frequencies together substantially occupying said band of frequencies, adjacent ones of said styli being associated with filters of adjacent frequency.

5. The combination in accordance with claim 4 wherein said filters each consists of a piezo-electric crystal and electrodes therefor.

6. A spectrum analyzer comprising a strip of time fed voltage sensitive recording paper, a plurality of stationary styli each in contact with said paper on one side thereof and at a different position thereof, a conductive platen in opposition to said styli and located on the other side of said paper in contact therewith, a separate narrow band pass filter in series with each of said styli, said filters arranged to have each a different pass band, the pass bands of any pair of filters connected to an adjacent pair of styli lying adjacent to and in overlapping relation with one another, and the conjoint pass bands of all said filters occupying a relatively wide frequency band.

7. The combination in accordance with claim 6, wherein said filters include piezo-electric crystals.

8. The combination in accordance with claim 6, wherein said filters are piezo-electric crystals having electrodes.

9. In combination, a plurality of styli arranged transversely of a visual indicating medium, a separate band-pass filter connected in series with each of said styli, a source of amplitude varying signal, a frequency modulatable source of oscillations, means responsive to said signal for modulating the frequency of said oscillations to have substantially one frequency at any instant of time, said filters each having a different pass-band, the total extent of said pass-bands including the frequencies of said oscillations during frequency modulation thereof, and means for applying said oscillations in parallel to all said band-pass filters.

10. The combination according to claim 9, wherein said band-pass filters are piezo-electric crystals.

11. The combination according to claim 9, wherein said visual indicating medium is a voltage sensitive recording paper.

12. The combination according to claim 9, wherein said visual indicating medium is an electro-luminescent material.

13. A recording oscillograph comprising an array of styli arranged in order transversely of a record receiver, a separate band-pass filter in series with each of said styli, said filters constituting an array each member of which has a different band-pass, the band-passes being arranged in ordered sequence and together having a total band-pass proportional to the band-pass of a single filter times the number of styli in said array of styli, a source of amplitude varying signal, a source of frequency modulatable oscillations, means for modulating the frequency of said oscillations in response to said amplitude varying signals over at least a portion of said total band-pass, an electro-luminescent plate underlying said styli, each one of said styli being in current transfer relation to a different area of said plate, whereby each of said areas will be illuminated during passage of said oscillations through the band-pass filter in series with the stylus in current transfer relation to the area, said record receiver having further areas each in immediate proximity to one of said areas of said luminescent plate, and means for applying said oscillations in parallel to all said band-pass filters.

14. A recorder for recording on a moving sensitive recording medium, said recorder including a plate having electro-luminescent phosphor thereon, said recording medium moving over said plate, a plurality of styli, a separate series resonant filter connected to each of said styli, each of said styli being connected in series with a different area of said plate whereby to energize a different electro-luminescent area of said plate, means for applying a frequency varying signal in parallel to said series resonant filters, said series resonant filters each series resonant to a different frequency.

15. A system for generating a scanning light spot, comprising an electroluminescent medium, a plurality of electrodes in contact with said medium at spaced points along said medium, a separate filter in circuit with each of said electrodes, each filter being tuned to a different frequency and all said frequencies occupying a predetermined relatively limited frequency band, means for applying a frequency varying signal in parallel to all said electrodes via all said filters, said frequency varying over said frequency band, and the amplitude of said signal being adequate to effect illumination of said electroluminescent medium only when applied to an electrode via a filter resonant to the frequency of said signal.

References Cited in the file of this patent

UNITED STATES PATENTS

| | | |
|---|---|---|
| 2,579,831 | Keinath | Dec. 25, 1951 |
| 2,637,024 | Lyman | Apr. 28, 1953 |
| 2,769,091 | Hansel | Oct. 30, 1956 |

OTHER REFERENCES

Electromechanical, Transducers and Wave Filters, by Warren P. Mason, pages 258–259.